(12) United States Patent
Ohashi (10) Patent No.: US 11,467,137 B2
(45) Date of Patent: Oct. 11, 2022

(54) LIQUID CHROMATOGRAPH AND ANALYSIS EXECUTION METHOD

(71) Applicant: SHIMADZU CORPORATION, Kyoto (JP)

(72) Inventor: Hiroshi Ohashi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 51 days.

(21) Appl. No.: 17/154,718

(22) Filed: Jan. 21, 2021

(65) Prior Publication Data

US 2021/0223215 A1 Jul. 22, 2021

(30) Foreign Application Priority Data

Jan. 22, 2020 (JP) .............................. JP2020-008537

(51) Int. Cl.
*G01N 30/26* (2006.01)
*G01N 30/02* (2006.01)

(52) U.S. Cl.
CPC ....... *G01N 30/26* (2013.01); *G01N 2030/027* (2013.01)

(58) Field of Classification Search
CPC ............. G01N 30/26; G01N 2030/027; G01N 2030/347; G01N 30/34; G01N 30/88
See application file for complete search history.

(56) References Cited

U.S. PATENT DOCUMENTS

| | | | | |
|---|---|---|---|---|
| 3,373,872 A * | 3/1968 | Hrdina | ................... | G01N 33/48 210/659 |
| 6,344,172 B1 * | 2/2002 | Afeyan | .............. | B01D 15/1871 422/527 |
| 2001/0027949 A1 * | 10/2001 | Safir | ...................... | B01D 15/08 210/635 |
| 2003/0004094 A1 * | 1/2003 | Ghose | .................... | B01D 15/16 530/416 |
| 2005/0170525 A1 * | 8/2005 | Kuroda | .................... | B01J 20/06 436/514 |
| 2008/0116122 A1 * | 5/2008 | Wheelwright | ......... | B01D 15/10 210/143 |
| 2011/0039712 A1 * | 2/2011 | Bjorkesten | ........... | B01D 15/361 210/198.2 |
| 2011/0073548 A1 * | 3/2011 | Williams | ........... | B01D 15/1871 210/102 |

(Continued)

FOREIGN PATENT DOCUMENTS

| | | | | |
|---|---|---|---|---|
| JP | 2015-017924 A | | 1/2015 | |
| WO | WO-2019111438 A1 * | | 6/2019 | ............. G01N 30/20 |

*Primary Examiner* — David J Bolduc
(74) *Attorney, Agent, or Firm* — Renner, Otto, Boisselle & Sklar, LLP (57) ABSTRACT

When a flow path switch valve is in a first flow path state, an aqueous solvent supplied by an aqueous solvent supplier is guided to a first flow path, and a pH of the aqueous solvent is measured by a pH meter provided in the first flow path. When the flow path switch valve is in a second flow path state, the aqueous solvent supplied by the aqueous solvent supplier is guided to a second flow path. A sample to be analyzed is supplied by a sample supplier at a position farther downstream than the flow path switch valve. The solvent that has passed through the second flow path and the sample supplied by the sample supplier are guided to a separation column. The sample that has passed through the separation column is detected by a detector.

7 Claims, 7 Drawing Sheets

(56) References Cited

U.S. PATENT DOCUMENTS

| | | | |
|---|---|---|---|
| 2012/0093692 A1* | 4/2012 | Blomberg | G01N 30/88 210/198.2 |
| 2012/0217192 A1* | 8/2012 | Blank | B01D 15/166 366/152.4 |
| 2013/0109102 A1* | 5/2013 | Li | G01N 30/34 436/51 |
| 2013/0130309 A1* | 5/2013 | Nutt | B01J 19/0093 435/35 |
| 2013/0218352 A1* | 8/2013 | Iovanni | G01N 30/465 700/282 |
| 2014/0157878 A1* | 6/2014 | Ohashi | G01N 30/34 73/61.56 |
| 2015/0019141 A1 | 1/2015 | Ohashi | |
| 2015/0066388 A1* | 3/2015 | Katsuyama | G01N 30/8658 702/31 |
| 2015/0160171 A1* | 6/2015 | Anzellotti | G01N 30/74 73/61.48 |
| 2016/0054273 A1* | 2/2016 | Hyung | G01N 30/463 73/61.56 |
| 2016/0115517 A1* | 4/2016 | Heijstra | G01N 30/02 435/288.6 |
| 2016/0223574 A1* | 8/2016 | Bhargav | G01N 35/00712 |
| 2016/0377644 A1* | 12/2016 | Blomberg | G01N 30/88 73/61.56 |
| 2017/0292937 A1* | 10/2017 | Carredano | B01F 21/02 |
| 2017/0326474 A1* | 11/2017 | Olovsson | B01F 35/7176 |
| 2019/0101513 A1* | 4/2019 | Phoebe | G01N 30/32 |
| 2019/0358561 A1* | 11/2019 | Cirou | C12M 23/44 |
| 2019/0374874 A1* | 12/2019 | Cirou | G01N 30/20 |
| 2020/0103381 A1* | 4/2020 | Ito | G01N 30/8651 |
| 2020/0158698 A1* | 5/2020 | Ohashi | B01D 15/166 |
| 2020/0197832 A1* | 6/2020 | Carredano | G01N 30/8658 |
| 2020/0206653 A1* | 7/2020 | Lundkvist | B01D 15/22 |
| 2020/0348270 A1* | 11/2020 | Nakayama | G01N 30/24 |
| 2021/0033574 A1* | 2/2021 | Heise | G01N 30/462 |
| 2021/0149361 A1* | 5/2021 | Jungbauer | G01N 30/88 |
| 2021/0199679 A1* | 7/2021 | Seal | G01N 30/34 |
| 2021/0382020 A1* | 12/2021 | Watanabe | G01N 30/468 |

* cited by examiner

LIQUID CHROMATOGRAPH AND ANALYSIS EXECUTION METHOD

BACKGROUND

Technical Field

The present invention relates to a liquid chromatograph and an analysis execution method.

Description of Related Art

A liquid chromatograph has been known as a device that separates a substance included in a sample into different components. For example, in a liquid chromatograph described in JP 2015-017924 A, a sample to be analyzed is introduced into a column. Further, an aqueous solvent and an organic solvent are supplied to the column while being mixed. The sample that has been introduced into the column is eluted into compounds based on a difference in chemical property or composition and then is detected by a detector. A chromatogram is created based on a result of detection by the detector.

In the liquid chromatograph, it is necessary to select each of parameters of an analysis method appropriately based on a sample to be analyzed such that the sample is separated without peaks of a chromatogram overlapping with each other. Here, the parameters of the analysis method include an injection amount of a sample, the type of a column, the temperature in the column, a detection wavelength or a pH of a mobile phase, for example.

SUMMARY

As described above, because influencing a result of analysis of a sample, the pH of a mobile phase is required to be measured accurately in order for an analysis method to be set appropriately. However, in a liquid chromatograph, it may be difficult to measure the pH of a mobile phase accurately without interfering with an accurate analysis of a sample.

An object of the present invention is to provide a liquid chromatograph and an analysis execution method that enables accurate measurement of a pH of a mobile phase without interfering with an accurate analysis of a sample.

One aspect of the present invention relates to a liquid chromatograph comprising a first flow path, a second flow path, a first aqueous solvent supplier that supplies an aqueous solvent, a flow path switch valve that is switchable between a first flow path state where the aqueous solvent supplied by the first aqueous solvent supplier is guided to the first flow path and a second flow path state where the aqueous solvent supplied by the first aqueous solvent supplier is guided to the second flow path, a pH meter that is provided in the first flow path and measures a pH of the aqueous solvent flowing through the first flow path when the flow path switch valve is in the first flow path state, a sample supplier that supplies a sample to be analyzed at a position farther downstream than the flow path switch valve, a separation column into which the solvent that has passed through the second flow path and the sample supplied by the sample supplier are introduced, and a detector that detects the sample that has passed through the separation column.

Another aspect of the present invention relates to an analysis execution method including supplying an aqueous solvent using an aqueous solvent supplier, guiding the aqueous solvent supplied by the aqueous solvent supplier to a first flow path when a flow path switch valve is in a first flow path state, measuring a pH of the aqueous solvent guided to the first flow path using a pH meter provided in the first flow path, guiding the aqueous solvent supplied by the aqueous solvent supplier to a second flow path when the flow path switch valve is in a second flow path state, supplying a sample to be analyzed at a position farther downstream than the flow path switch valve, and introducing the solvent that has passed through the second flow path and the supplied sample into a separation column, and detecting the sample that has passed through the separation column.

With the present invention, it is possible to measure the pH of a mobile phase accurately without interfering with an accurate analysis of the sample.

Other features, elements, characteristics, and advantages of the present disclosure will become more apparent from the following description of preferred embodiments of the present disclosure with reference to the attached drawings.

DETAILED DESCRIPTION

(1) Configuration of Chromatograph

Figure 1:
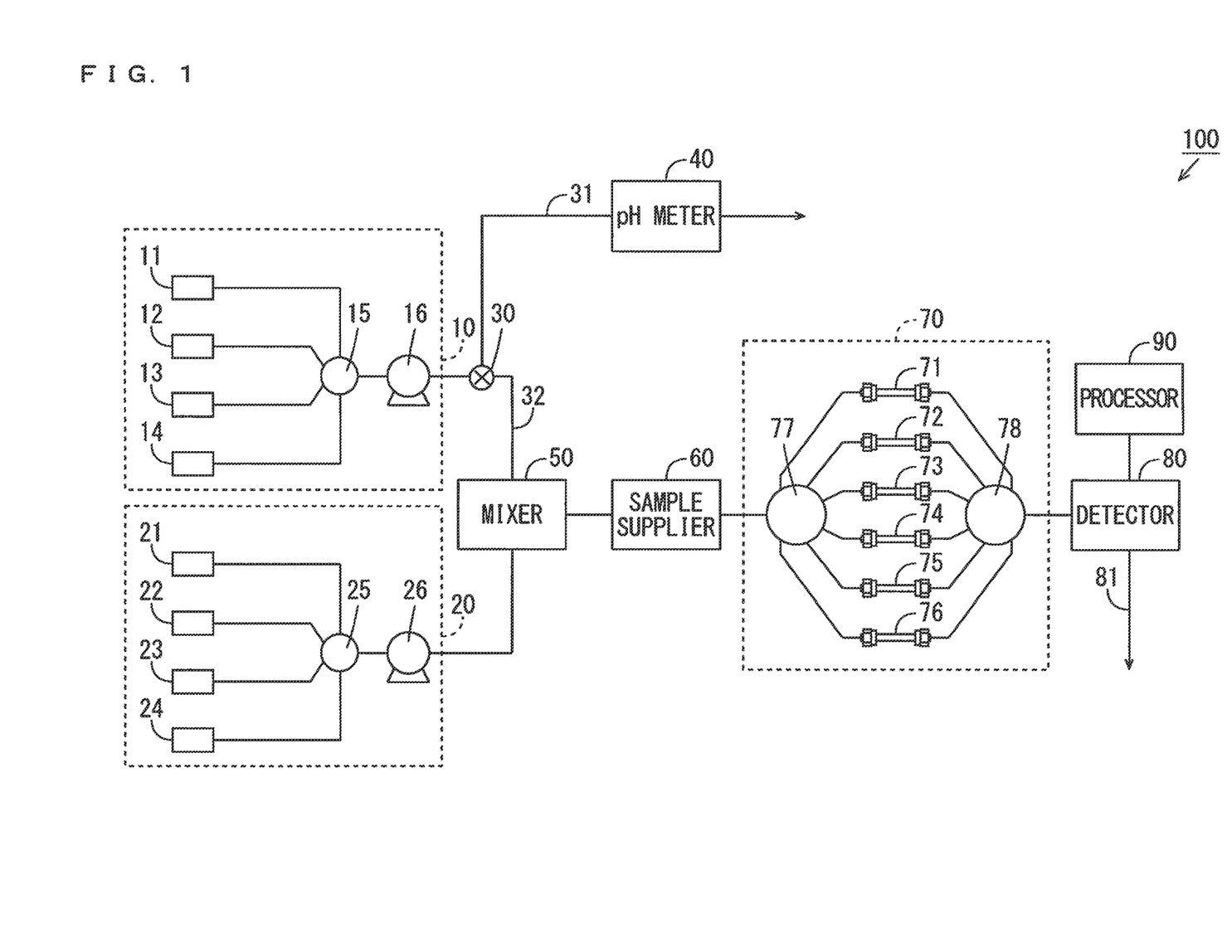
FIG. 1 is a schematic diagram showing the configuration of a liquid chromatograph according to one embodiment of the present invention.

A liquid chromatograph and an analysis execution method according to embodiments of the present invention will be described below in detail with reference to the drawings. FIG. 1 is a schematic diagram showing the configuration of the liquid chromatograph according to one embodiment of the present invention. As shown in FIG. 1, in the present embodiment, the liquid chromatograph 100 includes an aqueous solvent supplier 10, an organic solvent supplier 20, a flow path switch valve 30, a pH meter 40, a mixer 50, a sample supplier 60, a column oven 70, a detector 80 and a processor 90.

The aqueous solvent supplier 10 includes a plurality (four in the present example) of solvent bottles 11 to 14, a flow path switch valve 15 and a liquid sending pump 16. The solvent bottles 11 to 14 respectively stores different types of aqueous solvents. The flow path switch valve 15 is an example of a selector and selects one or more solvent bottles from the solvent bottles 11 to 14 by switching the flow paths between the flow path switch valve 15 and the solvent bottles 11 to 14. The liquid sending pump 16 pumps an aqueous solvent stored in a solvent bottle selected by the flow path switch valve 15.

The organic solvent supplier 20 includes a plurality (four in the present example) of solvent bottles 21 to 24, a flow path switch valve 25 and a liquid sending pump 26. The solvent bottles 21 to 24 respectively store different types of organic solvents. The flow path switch valve 25 selects one or more solvent bottles from the solvent bottles 21 to 24 by switching the flow paths between the flow path switch valve 25 and the solvent bottles 21 to 24. The liquid sending pump 26 pumps an organic solvent stored in a solvent bottle selected by the flow path switch valve 25.

The flow path switch valve 30 is switchable between a first flow path state and a second flow path state and is provided at a position farther downstream than the liquid sending pump 16. In the first flow path state, the flow path switch valve 30 guides an aqueous solvent pumped by the liquid sending pump 16 to a liquid drain (not shown) through one flow path 31. In the second flow path state, the flow path switch valve 30 guides an aqueous solvent pumped by the liquid sending pump 16 to the mixer 50 through another flow path 32.

The flow path switch valve 30 is switched to the first flow path state when the pH of an aqueous solvent is measured and is switched to the second flow path state when a sample is analyzed. The pH meter 40 is provided in the flow path 31 and measures the pH of the aqueous solvent flowing through the flow path 31 when the flow path switch valve 30 is in the first flow path state. The pH of the aqueous solvent measured by the pH meter 40 may be stored by the processor 90 as one parameter of the analysis method. In this case, method scouting for searching an optimal analysis method can be carried out easily.

Since a downstream portion of the flow path 31 is connected to the liquid drain in which the pressure is maintained at an atmospheric pressure, the pressure in the flow path 31 is relatively low. Specifically, the pressure in the flow path 31 is lower than 1 MPa and is 0.4 MPa to 0.2 MPa in the present example. On the other hand, since a downstream portion of the flow path 32 is connected to a separation column described below, the pressure in the flow path 32 is relatively high. Specifically, the pressure in the flow path 32 is higher than 40 MPa and is equal to or higher than 100 MPa in the present example. Further, in the present example, the cross sectional area of the flow path 31 is larger than the cross sectional area of the flow path 32.

The mixer 50 is a gradient mixer, for example. The mixer 50 generates various solvents (mobile phase) by mixing an aqueous solvent flowing through the flow path 32 when the flow path switch valve 30 is in the second flow path state with an organic solvent pumped by the liquid sending pump 26 at any ratio. The sample supplier 60 is an auto sampler, for example, and introduces a sample to be analyzed to the separation column together with a solvent mixed by the mixer 50.

The column oven 70 houses a plurality (six in the present example) of separation columns 71 to 76 and flow path switch valves 77, 78 and adjusts the temperature in the column oven 70 to a constant value. The plurality of separation columns 71 to 76 are connected in parallel to one another between the flow path switch valve 77 and the flow path switch valve 78. Each of the separation columns 71 to 76 separates a guided sample into components based on a difference in chemical property or composition. The flow path switch valves 77, 78 select a separation column into which a sample is to be introduced from the separation columns 71 to 76 by switching the flow paths between the flow path switch valves 77, 78.

The detector 80 includes an absorbance detector or an RI (Refractive Index) detector, for example, and detects components into which a sample is separated by any of the columns. A sample and a solvent that have passed through the detector 80 are drained through the flow path 81.

The processor 90 includes a CPU (Central Processing Unit) and a memory, a microcomputer, etc. and controls the operation of each of the aqueous solvent supplier 10, the organic solvent supplier 20, the flow path switch valve 30, the mixer 50, the sample supplier 60, the column oven 70 and the detector 80. Further, the processor 90 generates a chromatogram representing the relationship between a retention time of each component by a column and detection intensity by processing a result of detection by the detector 80.

(2) Effects

In the liquid chromatograph 100 according to the present embodiment, an aqueous solvent is supplied by the aqueous solvent supplier 10. When the flow path switch valve 30 is in the first flow path state, the aqueous solvent supplied by the aqueous solvent supplier 10 is guided to the flow path 31. The pH of the aqueous solvent guided to the flow path 31 is measured by the pH meter 40 provided in the flow path 31.

When the flow path switch valve 30 is in the second flow path state, the aqueous solvent supplied by the aqueous solvent supplier 10 is guided to the flow path 32. An organic solvent is supplied by the organic solvent supplier 20. The aqueous solvent flowing through the flow path 32 and the organic solvent supplied by the organic solvent supplier 20 are mixed by the mixer 50. A sample to be analyzed is supplied by the sample supplier 60. The mixed solvent and the supplied sample are introduced into any of the separation columns 71 to 76. The sample that has passed through any of the separation columns 71 to 76 is detected by the detector 80.

With this configuration, even in a case where an organic solvent is used for an analysis of a sample, an organic solvent does not flow into the flow path 31. Therefore, the organic solvent is not mixed with an aqueous solvent flowing through the flow path 31. Therefore, in the flow path 31, the pH of a mobile phase can be measured accurately. Further, even in a case where an electrolyte solution such as KCl (potassium chloride) is released from the pH meter 40, the electrolyte solution does not flow into the flow path 32. Therefore, an electrolyte solution does not flow into the detector 80 and does not influence an analysis of a sample.

Further, the pressure in the flow path 31 is lower than 1 MPa. In this manner, because the pressure in the flow path 31 is sufficiently low, even in a case where the pH meter 40 is provided in the flow path 31, the pH meter 40 is easily prevented from being damaged. Further, because the flow path switch valve 30 is located at a position farther upstream than the sample supplier 60, even in a case where a sample supplied by the sample supplier 60 includes protein, the protein does not adhere to a glass electrode of the pH meter 40. As a result, it is possible to measure the pH of a mobile phase accurately without interfering with an accurate analysis of a sample.

Further, in the present embodiment, the cross sectional area of the flow path 31 is larger than the cross sectional area of the flow path 32. In this case, even immediately after the flow path switch valve 30 is switched from the second flow path state to the first flow path state, an aqueous solvent is not guided to the flow path 31 in a high-pressure state. Thus, the pH meter 40 provided in the flow path 31 can be more easily prevented from being damaged.

(3) Modified Example

Figure 2:
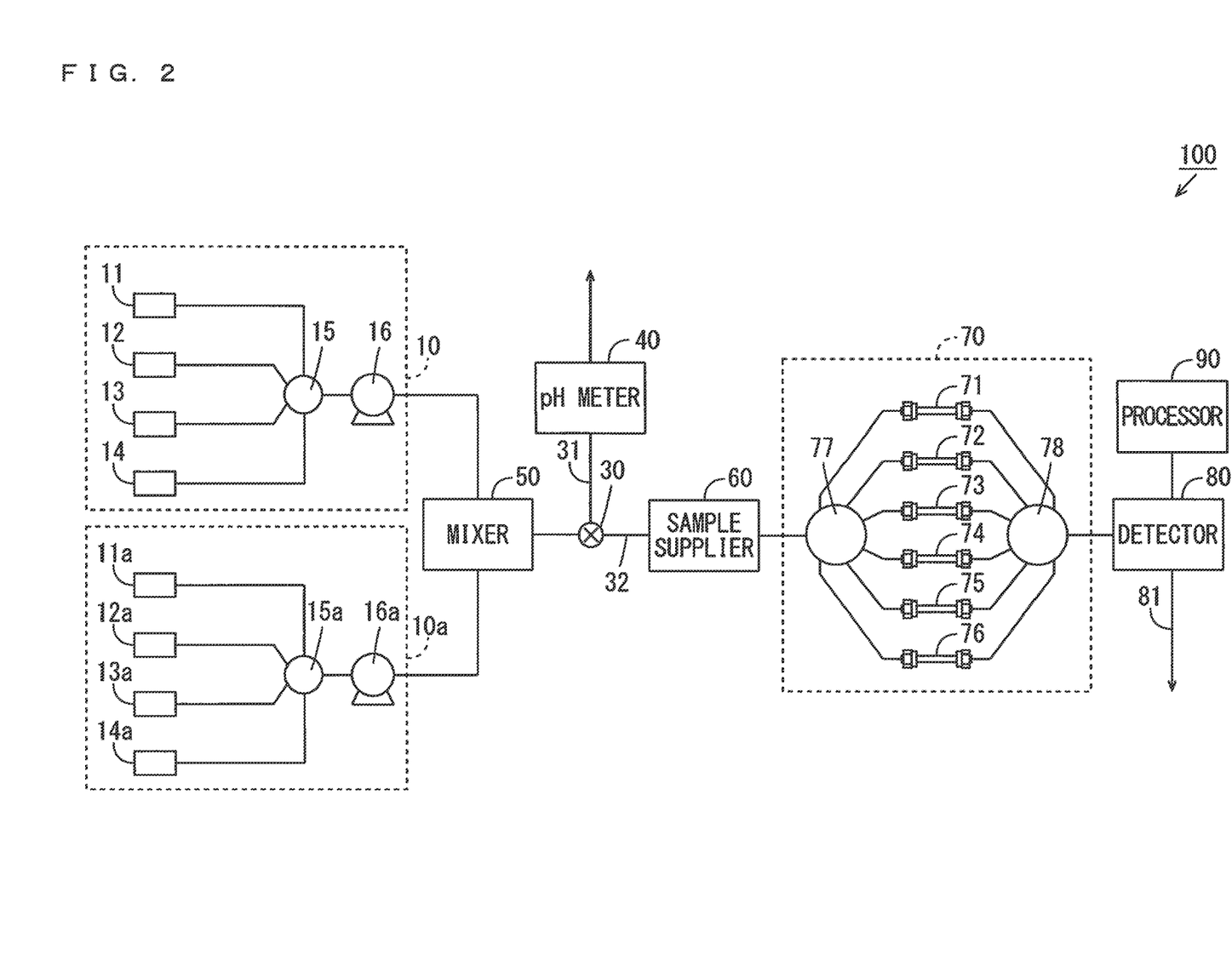
FIG. 2 is a schematic diagram showing the configuration of a liquid chromatograph according to a modified example.

While the liquid chromatograph 100 includes the organic solvent supplier 20 in the present embodiment, the present embodiment is not limited to this. FIG. 2 is a schematic diagram showing the configuration of a liquid chromatograph 100 according to a modified example. As shown in FIG. 2, the liquid chromatograph 100 according to the modified example includes an aqueous solvent supplier 10a instead of the organic solvent supplier 20. The aqueous solvent supplier 10a has the similar configuration to that of the aqueous solvent supplier 10 and includes solvent bottles 11a, to 14a, a flow path switch valve 15a and a liquid sending pump 16a.

A flow path switch valve 30 is arranged between a mixer 50 and a sample supplier 60. The mixer 50 generates various aqueous solvents as mobile phases by mixing an aqueous solvent pumped by a liquid sending pump 16 of an aqueous solvent supplier 10 with an aqueous solvent pumped by the liquid sending pump 16a of the aqueous solvent supplier 10a at any ratio.

In a first flow path state, the flow path switch valve 30 guides the aqueous solvent generated by the mixer 50 to a liquid drain (not shown) through one flow path 31. In a second flow path state, the flow path switch valve 30 guides the aqueous solvent generated by the mixer 50 to a sample supplier 60 through another flow path 32. A pH meter 40 is provided in the flow path 31 and measures the pH of the aqueous solvent flowing through the flow path 31 when the flow path switch valve 30 is in the first flow path state.

Also with this configuration, because the flow path switch valve 30 is located at a position farther upstream than the sample supplier 60, even in a case where a sample supplied by the sample supplier 60 includes protein, the protein does not adhere to a glass electrode of the pH meter 40. Therefore, it is possible to measure the pH of an aqueous solvent accurately without interfering with an accurate analysis of the sample.

While the liquid chromatograph 100 includes the aqueous solvent supplier 10a and the mixer 50 in the modified example, the embodiment is not limited to this. The liquid chromatograph 100 does not have to include the aqueous solvent supplier 10a or the mixer 50. In this case, the flow path switch valve 30 is arranged between the aqueous solvent supplier 10 and the sample supplier 60.

(4) Other Embodiments

In the above-mentioned embodiment, the flow path switch valve 30 is provided at a position farther downstream than the liquid sending pump 16. With this configuration, even in a case where being used for an analysis of a sample, a plurality of types of aqueous solvents are sufficiently mixed at a position farther downstream than the liquid sending pump 16. Thus, the pH of a mobile phase can be measured accurately by the pH meter 40 in the flow path 31. Meanwhile, the embodiment is not limited to this. The flow path switch valve 30 may be provided at a position farther upstream than the liquid sending pump 16.

Figure 3:
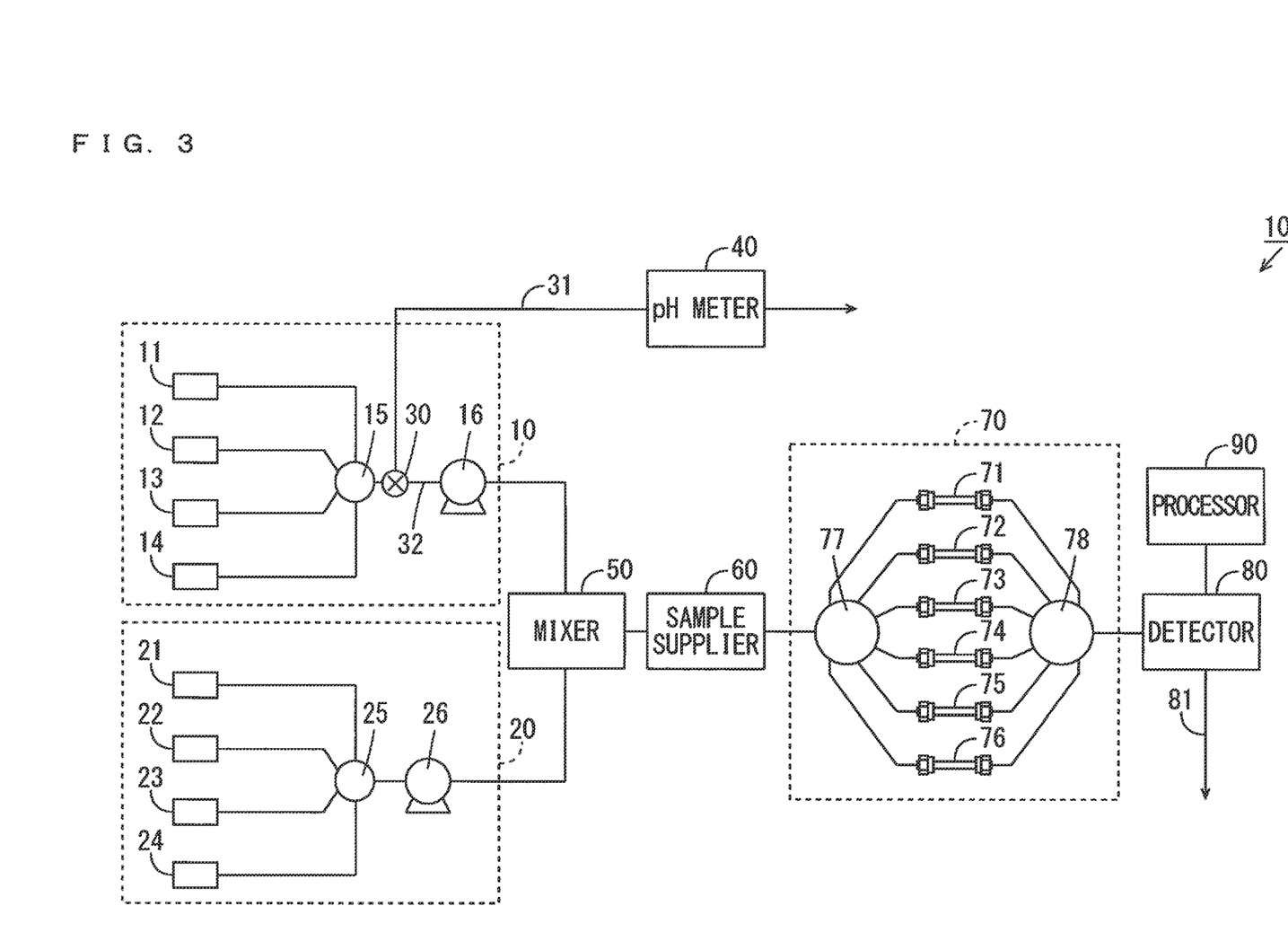
FIG. 3 is a schematic diagram showing the configuration of a liquid chromatograph according to another embodiment.

Differences from the liquid chromatograph 100 of FIG. 1 will be described below in regard to a liquid chromatograph 100 according to another embodiment. FIG. 3 is a schematic diagram showing the configuration of the liquid chromatograph according to the other embodiment. As shown in FIG. 3, in the present embodiment, a flow path switch valve 30 is arranged between a flow path switch valve 15 and a liquid sending pump 16.

In a first flow path state, the flow path switch valve 30 guides an aqueous solvent stored in a solvent bottle selected by the flow path switch valve 15 to a liquid drain (not shown) through one flow path 31. In a second flow path state, the flow path switch valve 30 guides an aqueous solvent stored in a solvent bottle selected by the flow path switch valve 15 to a liquid sending pump 16 through another flow path 32. A pH meter 40 is provided in the flow path 31 and measures the pH of the aqueous solvent flowing through the flow path 31 when the flow path switch valve 30 is in the first flow path state.

In the present embodiment, the pressure in the flow path 32 is relatively low. Therefore, even immediately after the flow path switch valve 30 is switched from the second flow path to the first flow path state, an aqueous solvent is not guided to the flow path 31 in a high-pressure state. Therefore, the pH meter 40 provided in the flow path 31 is prevented more easily from being damaged. While the liquid chromatograph 100 includes an organic solvent supplier 20 and a mixer 50 also in the present embodiment, the embodiment is not limited to this. The liquid chromatograph 100 does not have to include the organic solvent supplier 20 or the mixer 50.

(5) Reference Example

Figure 4:
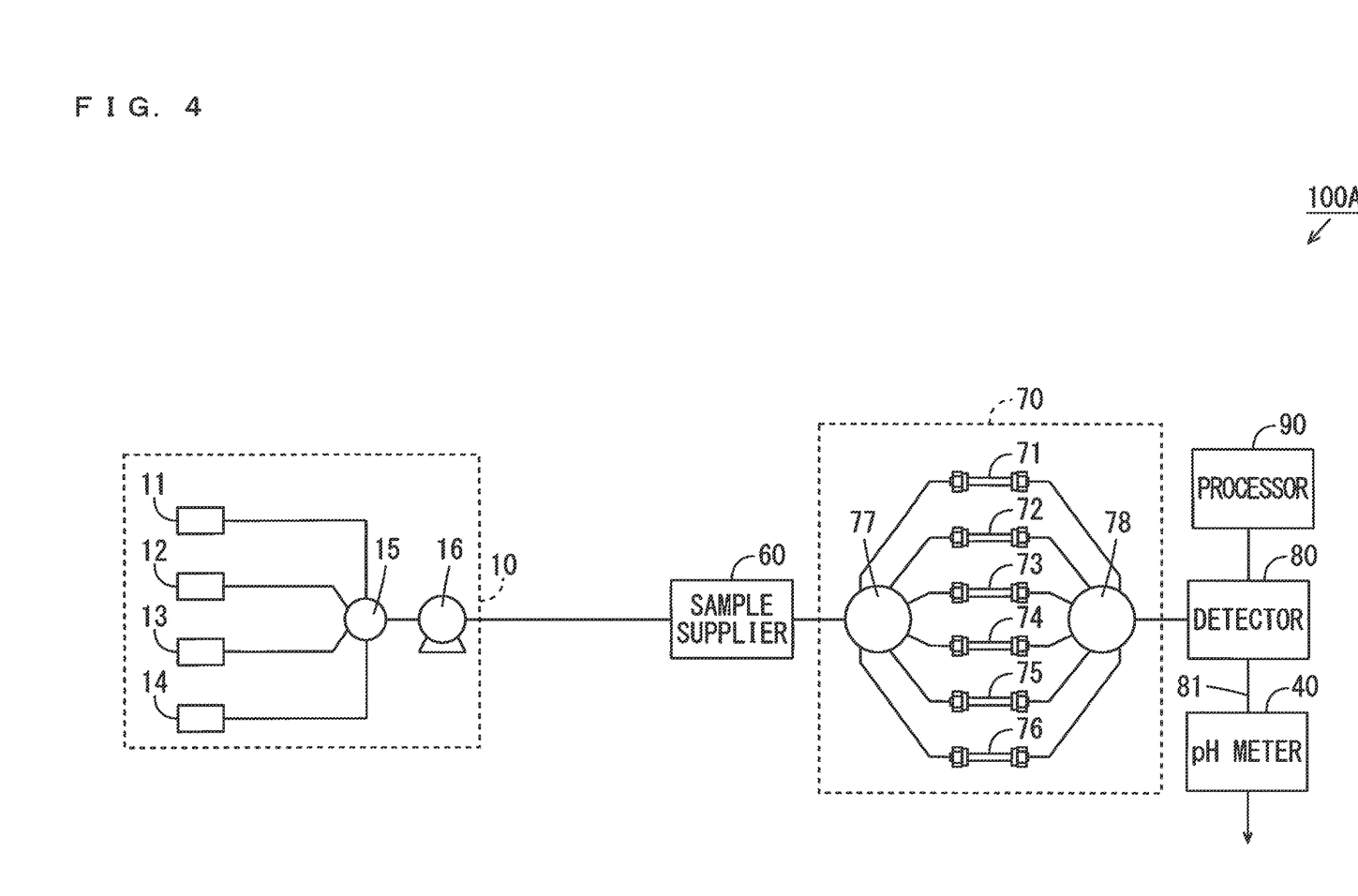
FIG. 4 is a schematic diagram showing the configuration of a liquid chromatograph according to a first reference example.

Difference from the liquid chromatograph 100 of FIG. 1 will be described in regard to a liquid chromatograph according to a reference example. FIG. 4 is a schematic diagram showing the configuration of a liquid chromatograph according to a first reference example. As shown in FIG. 4, the liquid chromatograph 100A according to the present example does not include an organic solvent supplier 20, a flow path switch valve 30 or a mixer 50. Further, a pH meter 40 is provided in a flow path 81 and measures the pH of a mobile phase flowing through the flow path 81.

In the present example, the pressure in the flow path 81 is relatively low. Therefore, the pH meter 40 is prevented from being damaged. Further, because the pH meter 40 is located at a position farther downstream than a detector 80, an electrolyte solution released from the pH meter 40 does not flow into the detector 80. Therefore, in a case where a solvent does not include an organic solvent as in the present example, it is possible to measure the pH of an aqueous solvent accurately by the pH meter 40 in the flow path 81 without interfering with an accurate analysis of a sample.

However, because the pH meter 40 is located at a position farther downstream than a sample supplier 60, in a case where a sample supplied by the sample supplier 60 includes protein, the protein adheres to a glass electrode of the pH meter 40. Therefore, the pH of an aqueous solvent cannot be measured accurately by the pH meter 40 in the flow path 81.

Figure 5:
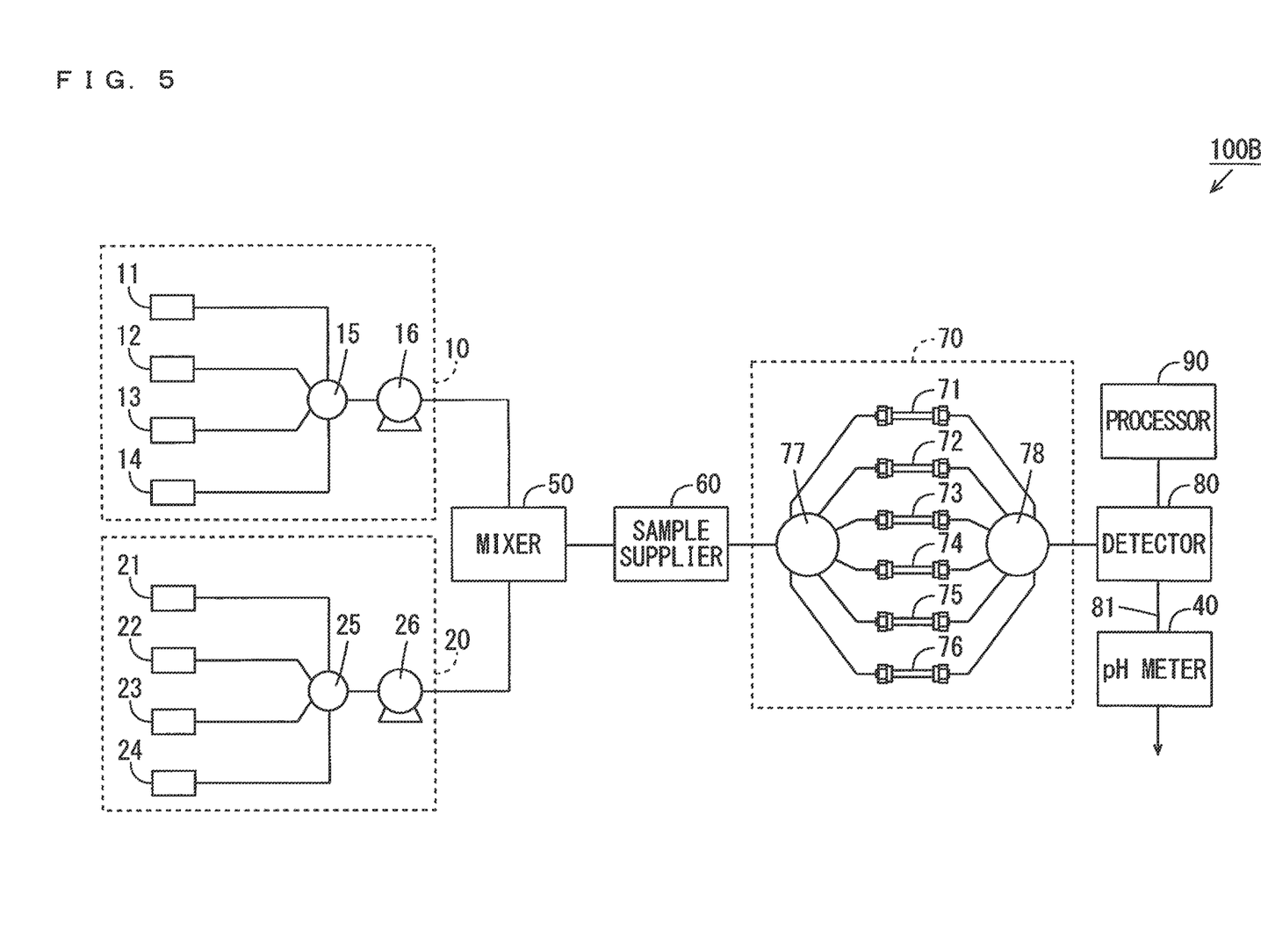
FIG. 5 is a schematic diagram showing the configuration of a liquid chromatograph according to a second reference example.

FIG. 5 is a schematic diagram showing the configuration of a liquid chromatograph according to a second reference example. As shown in FIG. 5, the liquid chromatograph 100B according to the present example does not include a flow path switch valve 30. Further, similarly to the first modified example, a pH meter 40 is provided at a position farther downstream than a detector 80 and in a flow path 81 in which the pressure is relatively low. In this case, the pH meter 40 is prevented from being damaged, and an accurate analysis of a sample is prevented from being interfered.

However, because a solvent including an organic solvent flows through the pH meter 40, the pH of an aqueous solvent cannot be measured accurately. Further, also in a case where a sample supplied by a sample supplier 60 includes protein, the protein adheres to a glass electrode of the pH meter 40. Thus, the pH of an aqueous solvent cannot be measured accurately.

Figure 6:
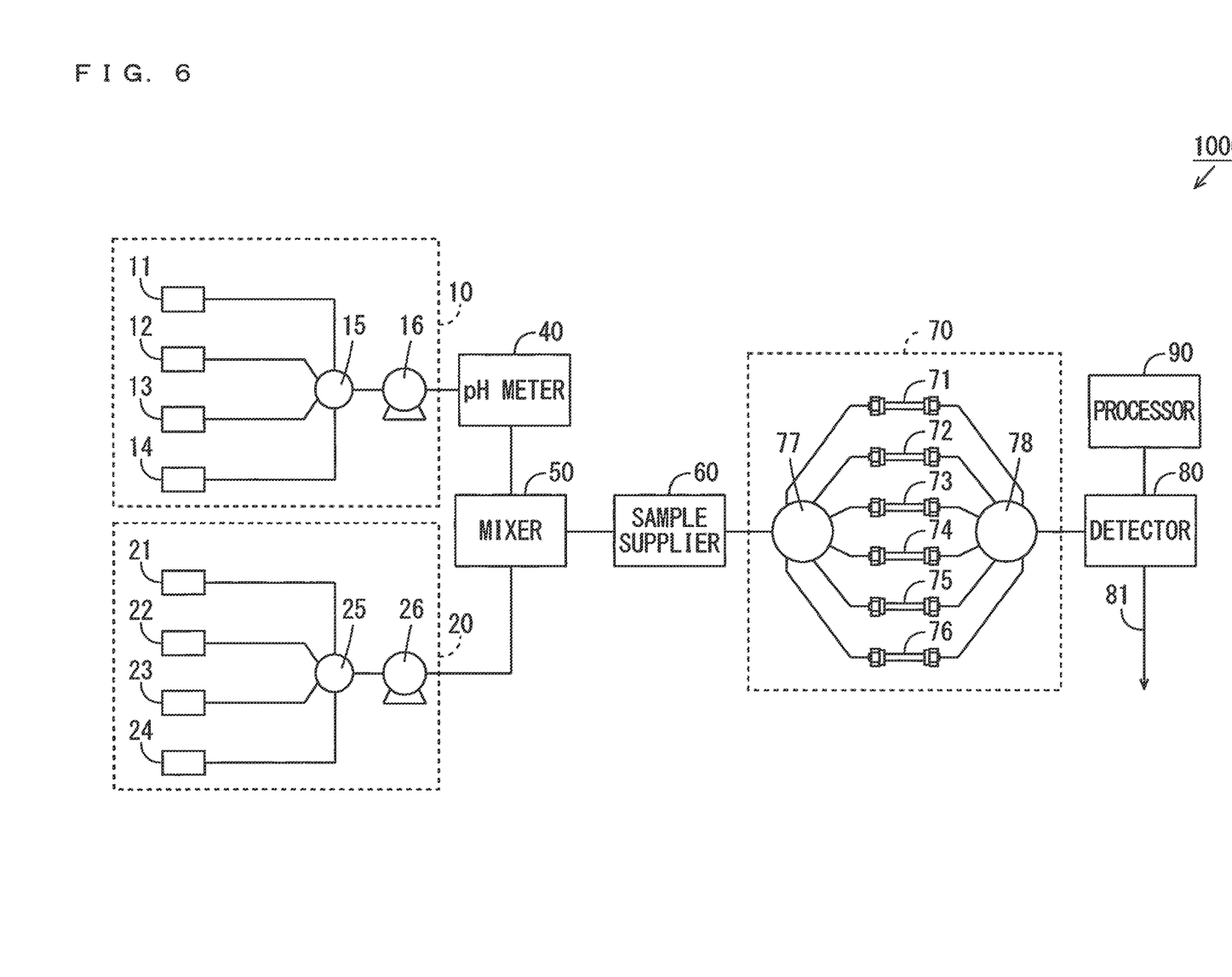
FIG. 6 is a schematic diagram showing the configuration of a liquid chromatograph according to a third reference example.

FIG. 6 is a schematic diagram showing the configuration of a liquid chromatograph according to a third reference example. As shown in FIG. 6, the liquid chromatograph 100C according to the present example does not include a flow path switch valve 30, and a pH meter 40 is provided in the flow path between a liquid sending pump 16 and a mixer 50. In this case, an organic solvent is prevented from flowing through the pH meter 40. However, because the pressure in the above-mentioned flow path is relatively high, the pH meter 40 is damaged. Therefore, the pH of an aqueous solvent cannot be measured. Further, an electrolyte solution released from the pH meter 40 flows into the detector 80. Therefore, an accurate analysis of a sample is interfered.

Figure 7:
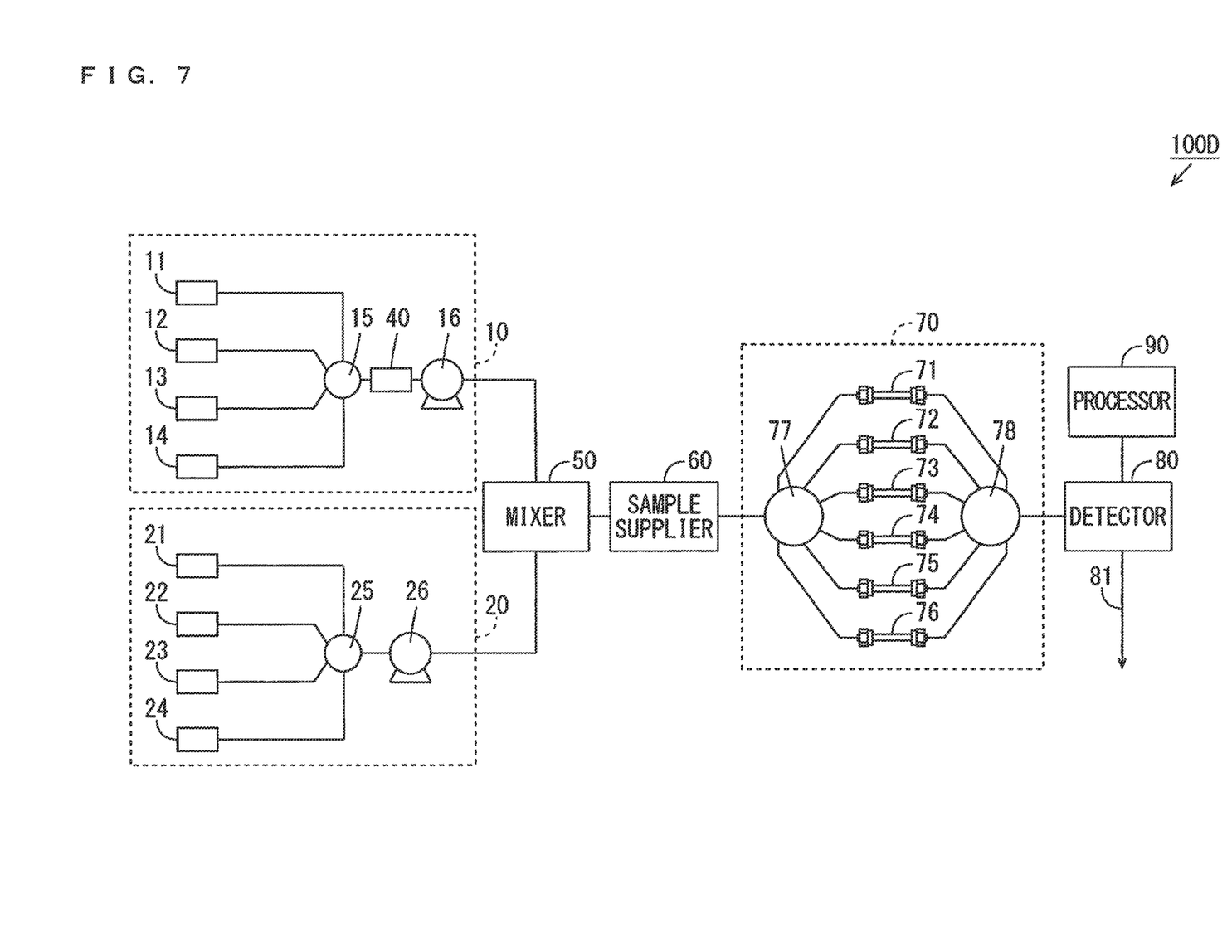
FIG. 7 is a schematic diagram showing the configuration of a liquid chromatograph according to a fourth reference example.

FIG. 7 is a schematic diagram showing the configuration of a liquid chromatograph according to a fourth reference example. As shown in FIG. 7, the liquid chromatograph 100D according to the present example does not include a flow path switch valve 30, and a pH meter 40 is provided in the flow path between a flow path switch valve 15 and a liquid sending pump 16. In this case, an organic solvent is prevented from flowing through the pH meter 40, and the pH meter 40 is prevented from being damaged. However, because an electrolyte solution released from the pH meter 40 flows into a detector 80, an accurate analysis of a sample is interfered.

(6) Aspects (Item 1) A liquid chromatograph according to one aspect may include a first flow path, a second flow path, a first aqueous solvent supplier that supplies an aqueous solvent, a flow path switch valve that is switchable between a first flow path state where the aqueous solvent supplied by the first aqueous solvent supplier is guided to the first flow path and a second flow path state where the aqueous solvent supplied by the first aqueous solvent supplier is guided to the second flow path, a pH meter that is provided in the first flow path and measures a pH of the aqueous solvent flowing through the first flow path when the flow path switch valve is in the first flow path state, a sample supplier that supplies a sample to be analyzed at a position farther downstream than the flow path switch valve, a separation column into which the solvent that has passed through the second flow path and the sample supplied by the sample supplier are introduced, and a detector that detects the sample that has passed through the separation column.

In this liquid chromatograph, the aqueous solvent is supplied by the first aqueous solvent supplier. When the flow path switch valve is in the first flow path state, the aqueous solvent supplied by the first aqueous solvent supplier is guided to the first flow path. The pH of the aqueous solvent guided to the first flow path is measured by the pH meter provided in the first flow path.

When the flow path switch valve is in the second flow path state, the aqueous solvent supplied by the first aqueous solvent supplier is guided to the second flow path. The sample to be analyzed is supplied by the sample supplier at a position farther downstream than the flow path switch valve. The solvent that has passed through the second flow path and the supplied sample are introduced into the separation column. The sample that has passed through the separation column is detected by the detector.

With this configuration, because the flow path switch valve is located at a position farther upstream than the sample supplier, even in a case where the sample supplied by the sample supplier includes protein, the protein does not adhere to a glass electrode of the pH meter. Therefore, in the first flow path, the pH of a mobile phase can be measured accurately. Further, even in a case where an electrolyte solution is released from the pH meter, the electrolyte solution does not flow into the second flow path. Therefore, the electrolyte solution does not flow into the detector and does not influence an analysis of a sample. As a result, it is possible to measure the pH of the mobile phase accurately without interfering with an accurate analysis of a sample.

(Item 2) In the liquid chromatograph according to item 1, an organic solvent supplier that supplies an organic solvent, and a mixer that mixes the aqueous solvent flowing through the second flow path when the flow path switch valve is in the second flow path state with the organic solvent supplied by the organic solvent supplier may further be included, and the flow path switch valve may be provided at a position farther upstream than the mixer, and the solvents mixed by the mixer and the sample supplied by the sample supplier may be introduced into the separation column.

With this configuration, even in a case where the organic solvent is used for an analysis of a sample, the organic solvent does not flow into the first flow path. Thus, the organic solvent is not mixed with the aqueous solvent flowing through the first flow path. Therefore, in the first flow path, the pH of a mobile phase can be measured accurately.

(Item 3) In the liquid chromatograph according to item 2, the first aqueous solvent supplier may include a selector that selects one or more types of aqueous solvents from a plurality of types of aqueous solvents, and a liquid sending pump that pumps the aqueous solvent selected by the selector, and the flow path switch valve may be provided between the liquid sending pump and the mixer, and may guide the aqueous solvent that is pumped by the liquid sending pump to the mixer through the second flow path when being in the second flow path state.

With this configuration, even in a case where a plurality of types of aqueous solvents are used for an analysis of a sample, the plurality of types of aqueous solvents are sufficiently mixed at a position farther downstream than the liquid sending pump. Thus, the pH of a mobile phase can be measured accurately.

(Item 4) In the liquid chromatograph according to item 1 or item 2, the first aqueous solvent supplier may include a selector that selects one or more types of aqueous solvents from a plurality of types of aqueous solvents, and a liquid sending pump that pumps the aqueous solvent selected by the selector, and the flow path switch valve may be provided between the selector and the liquid sending pump, and may guide the aqueous solvent that is selected by the selector to the liquid sending pump through the second flow path when being in the second flow path state.

With this configuration, because the pressure in the second flow path is relatively low, even immediately after the flow path switch valve is switched from the second flow path state to the first flow path state, the aqueous solvent is not guided to the first path in a high-pressure state. Thus, the pH meter provided in the first flow path can be more easily prevented from being damaged.

(Item 5) In the liquid chromatograph according to item 1, second aqueous solvent supplier that supplies an aqueous solvent, and a mixer that mixes the aqueous solvent supplied by the first aqueous solvent supplier with the aqueous solvent supplied by the second aqueous solvent supplier may be included, and the flow path switch valve may guide the aqueous solvents mixed by the mixer to the first flow path when being in the first flow path state, and may guide the aqueous solvents mixed by the mixer to the second flow path when being in the second flow path state, and the solvent that has passed through the second flow path and the sample supplied by the sample supplier may be introduced into the separation column.

In this case, aqueous solvents respectively supplied by the first and second aqueous solvent suppliers are mixed by the mixer, and the mixed aqueous solvent is guided to the first flow path. Therefore, in the first flow path, the pH of a mobile phase can be measured accurately.

(Item 6) In the liquid chromatograph according to any one of items 1 to 5, a pressure in the first flow path may be lower than 1 MPa.

With this configuration, because the pressure in the first flow path is sufficiently low, even in a case where the pH meter is provided in the first flow path, the pH meter is easily prevented from being damaged. Therefore, in the first flow path, the pH of a mobile phase can be measured accurately.

(Item 7) In the liquid chromatograph according to any one of items 1 to 6, a cross sectional area of the first flow path may be larger than a cross sectional area of the second flow path.

In this case, even immediately after the flow path switch valve is switched from the second flow path state to the first flow path state, the aqueous solvent is not guided to the first flow path in a high pressure state. Thus, the pH meter provided in the first flow path can be more easily prevented from being damaged.

(Item 8) An analysis execution method according to another aspect may include supplying an aqueous solvent using an aqueous solvent supplier, guiding the aqueous solvent supplied by the aqueous solvent supplier to a first flow path when a flow path switch valve is in a first flow path state, measuring a pH of the aqueous solvent guided to the first flow path using a pH meter provided in the first flow path, guiding the aqueous solvent supplied by the aqueous solvent supplier to a second flow path when the flow path switch valve is in a second flow path state, supplying a sample to be analyzed at a position farther downstream than the flow path switch valve, and introducing the solvent that has passed through the second flow path and the supplied sample into a separation column, and detecting the sample that has passed through the separation column.

With this analysis execution method, because the flow path switch valve is located at a position farther upstream than a position at which the sample is supplied, even in a case where the supplied sample includes protein, the protein does not adhere to a glass electrode of the pH meter. Therefore, in the first flow path, the pH of a mobile phase can be measured accurately. Further, even in a case where an electrolyte solution is released from the pH meter, the electrolyte solution does not flow into the second flow path. Therefore, the electrolyte solution does not flow into the detector and does not influence an analysis of a sample. As a result, it is possible to measure the pH of the mobile phase accurately without interfering with an accurate analysis of a sample.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

I claim:

1. A liquid chromatograph comprising:
   a first flow path;
   a second flow path;
   a first aqueous solvent supplier that includes a liquid sending pump and supplies an aqueous solvent;
   a flow path switch valve that is provided at a position farther upstream than the liquid sending pump and is switchable between a first flow path state where the aqueous solvent supplied by the first aqueous solvent supplier is guided to the first flow path and a second flow path state where the aqueous solvent supplied by the first aqueous solvent supplier is guided to the second flow path;
   a pH meter that is provided in the first flow path and measures a pH of the aqueous solvent flowing through the first flow path when the flow path switch valve is in the first flow path state;
   a sample supplier that supplies a sample to be analyzed to a position farther downstream than the flow path switch valve;
   a separation column into which the solvent that has passed through the second flow path and the sample supplied by the sample supplier are introduced; and
   a detector that detects the sample that has passed through the separation column.

2. The liquid chromatograph according to claim 1, further comprising:
   an organic solvent supplier that supplies an organic solvent; and
   a mixer that mixes the aqueous solvent flowing through the second flow path when the flow path switch valve is in the second flow path state with the organic solvent supplied by the organic solvent supplier, wherein
   the flow path switch valve is provided at a position farther upstream than the mixer, and
   the solvents mixed by the mixer and the sample supplied by the sample supplier are introduced into the separation column.

3. The liquid chromatograph according to claim 2, wherein
   the first aqueous solvent supplier includes
   a selector that selects one or more types of aqueous solvents from a plurality of types of aqueous solvents, and
   the liquid sending pump that pumps the aqueous solvent selected by the selector, and
   the flow path switch valve is provided between the liquid sending pump and the mixer, and guides the aqueous solvent that is pumped by the liquid sending pump to the mixer through the second flow path when being in the second flow path state.

4. The liquid chromatograph according to claim 1, wherein
   the first aqueous solvent supplier includes
   a selector that selects one or more types of aqueous solvents from a plurality of types of aqueous solvents, and
   the liquid sending pump that pumps the aqueous solvent selected by the selector, and
   the flow path switch valve is provided between the selector and the liquid sending pump, and guides the aqueous solvent that is selected by the selector to the liquid sending pump through the second flow path when being in the second flow path state.

5. The liquid chromatograph according to claim 1, wherein a pressure in the first flow path is lower than 1 MPa.

6. The liquid chromatograph according to claim 1, wherein
   a cross sectional area of the first flow path is larger than a cross sectional area of the second flow path.

7. An analysis execution method including:
   supplying an aqueous solvent using an aqueous solvent supplier that includes a liquid sending pump;
   guiding the aqueous solvent supplied by the aqueous solvent supplier to a first flow path when a flow path switch valve provided at a position farther upstream than the liquid sending pump is in a first flow path state;

measuring a pH of the aqueous solvent guided to the first flow path using a pH meter provided in the first flow path;

guiding the aqueous solvent supplied by the aqueous solvent supplier to a second flow path when the flow path switch valve is in a second flow path state;

supplying a sample to be analyzed to a position farther downstream than the flow path switch valve;

introducing the solvent that has passed through the second flow path and the supplied sample into a separation column; and detecting the sample that has passed through the separation column.

* * * * *